July 25, 1933.  R. G. WALKER  1,919,644
PROCESS FOR PURIFYING DRY CLEANERS' SOLVENTS
Filed Jan. 13, 1930
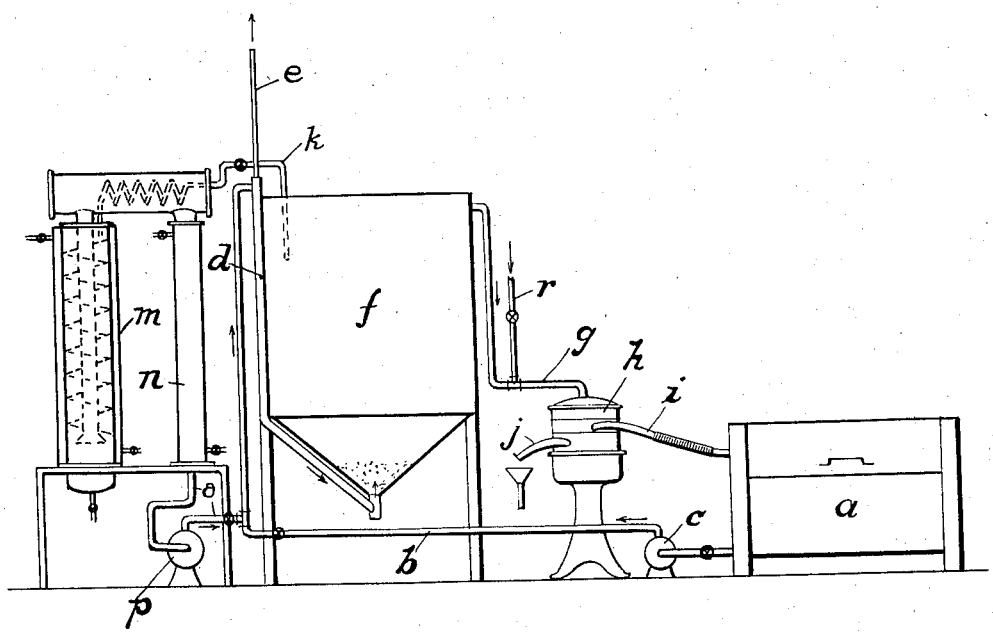
INVENTOR
WITNESS:  Robert G. Walker
BY
ATTORNEYS.

Patented July 25, 1933

1,919,644

UNITED STATES PATENT OFFICE

ROBERT G. WALKER, OF NEW YORK, N. Y., ASSIGNOR TO THE DE LAVAL SEPARATOR COMPANY, OF NEW YORK, N. Y., A CORPORATION OF NEW JERSEY

PROCESS FOR PURIFYING DRY CLEANERS' SOLVENTS

Application filed January 13, 1930. Serial No. 420,475.

My invention comprises a novel process for reconditioning, or maintaining approximately pure, dry cleaners' solvents.

Liquids used for dry cleaning solvents are usually petroleum products, such as gasoline, cleaners' naphtha and Stoddard solvent, although other solvents are sometimes used, such as benzol, carbon tetrachloride and trichlorethylene. Where "solvent" is hereinafter mentioned it is intended to include all such solvents.

When fabrics are washed in solvent there are three general classes of impurities taken up by the solvent.

The first class of impurities is solid dirt, which is taken into suspension.

The second class of impurities taken up by the solvent includes coloring and other matters of an animal or vegetable nature which are soluble in the solvent and which impart to it a dark brown color and at times a disagreeable odor which renders it unfit for further use.

The third class of impurities taken up by the solvent are mineral in nature, such as heavy lubricating oils removed from the clothes or higher boiling petroleum products formed by the polymerization of the petroleum solvents. Such impurities accumulate gradually in comparison to the other classes.

Methods and apparatus have been devised for removing each of these impurities. Gravity settlement, centrifuging and filtration effectively removes only the dirt. Flowing the solvent up through an alkaline solution (such as sodium or potassium hydroxide or sodium or potassium carbonate) with or without an active adsorbent, such as activated carbon of fuller's earth, removes dirt and coloring matter. Distillation of the solvent leaves the higher boiling hydrocarbon or other mineral impurities as a residue, but does not remove all of the second class of impurities, since certain fatty acids distill over with the solvent and may in time cause it to become rancid. No known system, except the combination of the two latter processes, effectively removes all the impurities, but this system involves the use of a large treating tank and either premature, unnecessary distillation or distillation after contamination has proceeded too far. None of the known systems or processes is both effective and economical.

The object of my invention is to provide a process whereby the solvent may be purified not only effectively but economically. In the preferred embodiment of the invention, the process is a continuous one, maintains the solvent constantly in a sufficiently pure and clean condition to meet all practical requirements, and involves the use of a small and economical treating tank and of a still which operates either intermittently, or continuously on only a fractional part of the solvent, thereby simplifying the process and materially reducing the expense.

Before describing the process involving my invention, I will first describe an apparatus in which my process may be carried out to the best advantage.

The drawing is a diagram, in sectional elevation, of the apparatus.

From the washer $a$ extends a pipe $b$ (in which is interposed a pump $c$) to a conduit $d$ (provided with a gas vent $e$) leading to the bottom of a treating tank $f$. The treating tank may be of the type shown in the Cherry Patent No. 1,698,257, June 8, 1929, or of the type shown in the McBerty application Serial No. 198,455, or of any other approved type. From the upper part of the treating tank $f$ extends a pipe $g$ leading to a centrifugal clarifier or purifier $h$, which has a discharge pipe $j$ for the heavier materials therein separated and a discharge pipe $i$ for the purified solvent. From the upper part of the treating tank extends a pipe $k$ to a still $m$, beyond which is a condenser $n$, from which an outlet pipe $o$ extends to the pipe $b$; a pump $p$ being interposed in pipe $o$.

The dirty solvent from the washer or washers $a$ enters the treating tank $f$ at the bottom, comes into contact with an alkaline solution and activated charcoal (or an alkaline solution alone), overflows the tank, and passes through the centrifugal purifier $h$, and thence to the washer or washers. I prefer to inject, through a pipe $r$, a stream of water into the solvent immediately before it enters the purifier $h$ for removing water-soluble impurities from the solvent, the water being subsequently removed by the centrifuge. While the main flow is as above explained, a portion is by-passed through the still $m$ either continuously or intermittently. This may be done by circulating some of the solvent to the still from the top of the treating tank through pipe $k$, the return from the still through pipe $o$ entering the treating tank along with the incoming dirty solvent; or part of the solvent can be by-passed to the still from any point along the line between the tank and washers.

This arrangement has the advantages that the entire flow through the unit is continuously treated, producing a solvent that is substantially white in color. As most of the reclamation is done by the relatively inexpensive chemical treatment, the use of the still is limited to the removal of the heavy mineral oils not completely removed by the chemical process. This results in more economical operation and a smaller still may be used.

The use of the centrifuge permits the use of a treating tank that is small in comparison of the hourly capacity of the still. Therefore, all of the solvent in the system can be distilled in a relatively short time and the effect of the still is more pronounced than where comparatively large volumes of solvent must be handled.

While we have shown the unit connected directly to a washer making a continuous system, it can also be used in the so-called batch system; that is, the dirty solvent in the washer may be dumped into a storage tank. The solvent is then pumped through a unit comprising a treating tank, still and centrifuge, the still being cut into or out of the circuit as above described, the clean solvent being discharged into a clean storage tank, from which it is pumped back into the washer as required.

The practice of the process does not exclude the use of a decolorizer of the type shown in the Flowers Patent No. 1,545,091, July 7, 1925, nor the arrangement of a decolorizer in a by-pass as therein shown.

In certain instances it is practicable to substitute a filter for a centrifuge and in claiming the step of centrifuging I mean to include as an equivalent the step of filtration.

In specifying in the claims the successive operations to which the solvent is subjected, I do not mean to be limited to the order in which said operations are recited. For example, the order in which distillation is effected depends on the points at which the entrance to and discharge from the by-pass are located. When these points are located specifically as above described, such of the solvent as is distilled flows successively through the treating tank, the still, the treating tank and the centrifuge; but such specific succession of flow is not required.

Having now fully described my invention, what I claim and desire to protect by Letters Patent is:

1. The process of cleaning solvent used in dry cleaning which comprises flowing used solvent in intimate contact with a decolorizing agent and then subjecting it to centrifugal force to separate the solvent from heavier impurities, said operations being conducted in series, and by-passing solvent, distilling it to eliminate high boiling hydrocarbons and returning the solvent to the flowing stream.

2. The process of cleaning solvent used in dry cleaning which comprises flowing used solvent in intimate contact with a decolorizing agent and subjecting it to centrifugal force to separate the solvent from heavier impurities, said operations being conducted while the solvent is flowing in an endless ring, and by-passing solvent from the flowing stream and distilling it to eliminate high boiling hydrocarbons and returning the distillate to the endless ring.

3. The process of cleaning solvent used in dry cleaning which comprises flowing used solvent in an endless ring from and back to a source of supply and in the course of its flow removing impurities therefrom and by-passing solvent from the endless ring and distilling it to eliminate high boiling hydrocarbons and returning the distillate to the endless ring.

4. The process of cleaning solvent used in dry cleaning which comprises establishing a circulation of solvent through, from and back to a source of supply and in the course of its flow subjecting the solvent to decolorization and centrifugation, and substantially continuously by-passing a relatively small volume of the solvent and distilling it to eliminate high boiling hydrocarbons and substantially continuously returning the distillate to the circulation.

5. The process of cleaning solvent used in dry cleaning which comprises establishing a circulation of solvent through, from and back to a source of supply and in the course of its flow subjecting it to decolorization and centrifugation, and intermittently by-passing solvent and distilling it to eliminate high boiling hydrocarbons and returning the distillate to the circulation.

ROBERT G. WALKER.